UNITED STATES PATENT OFFICE.

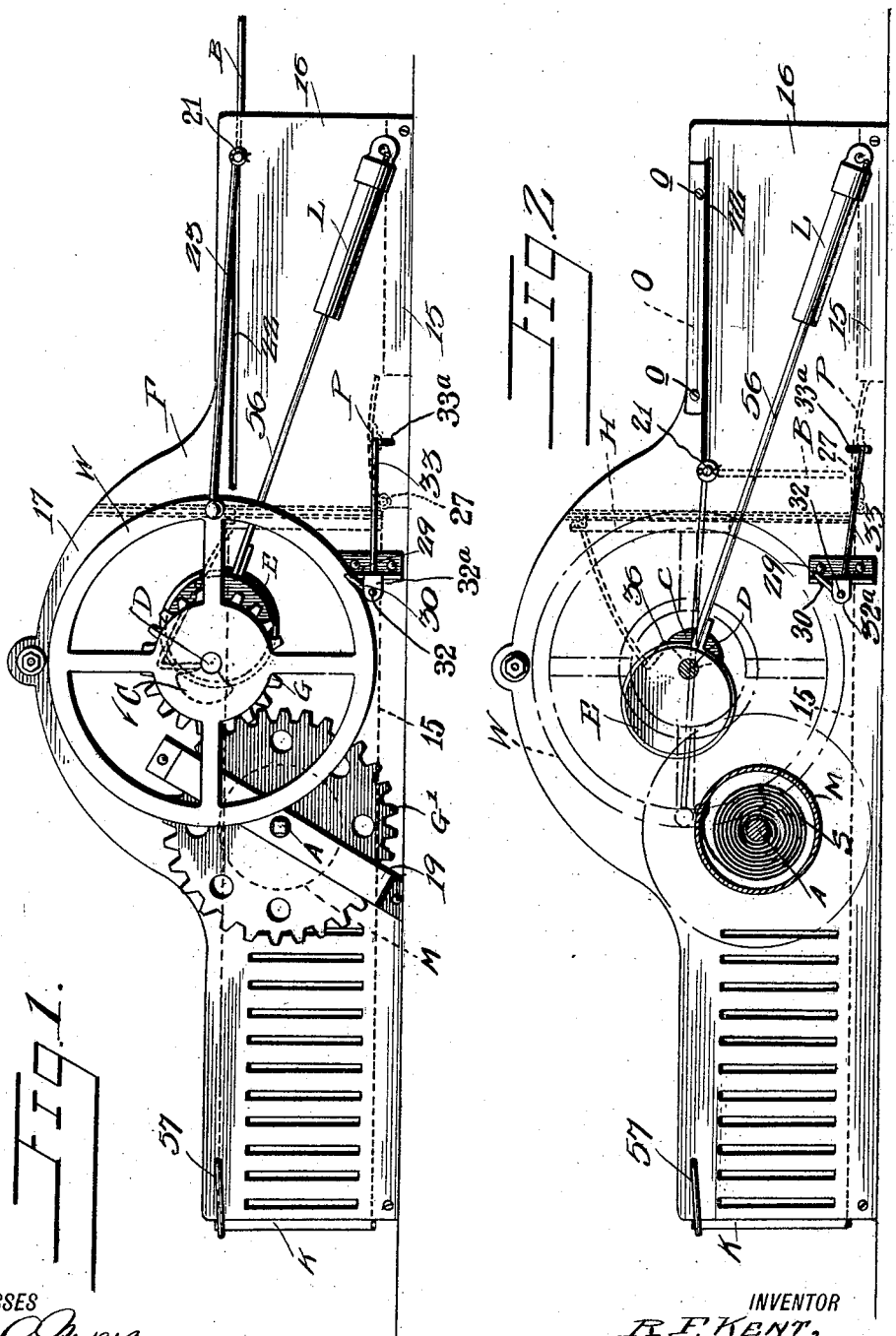

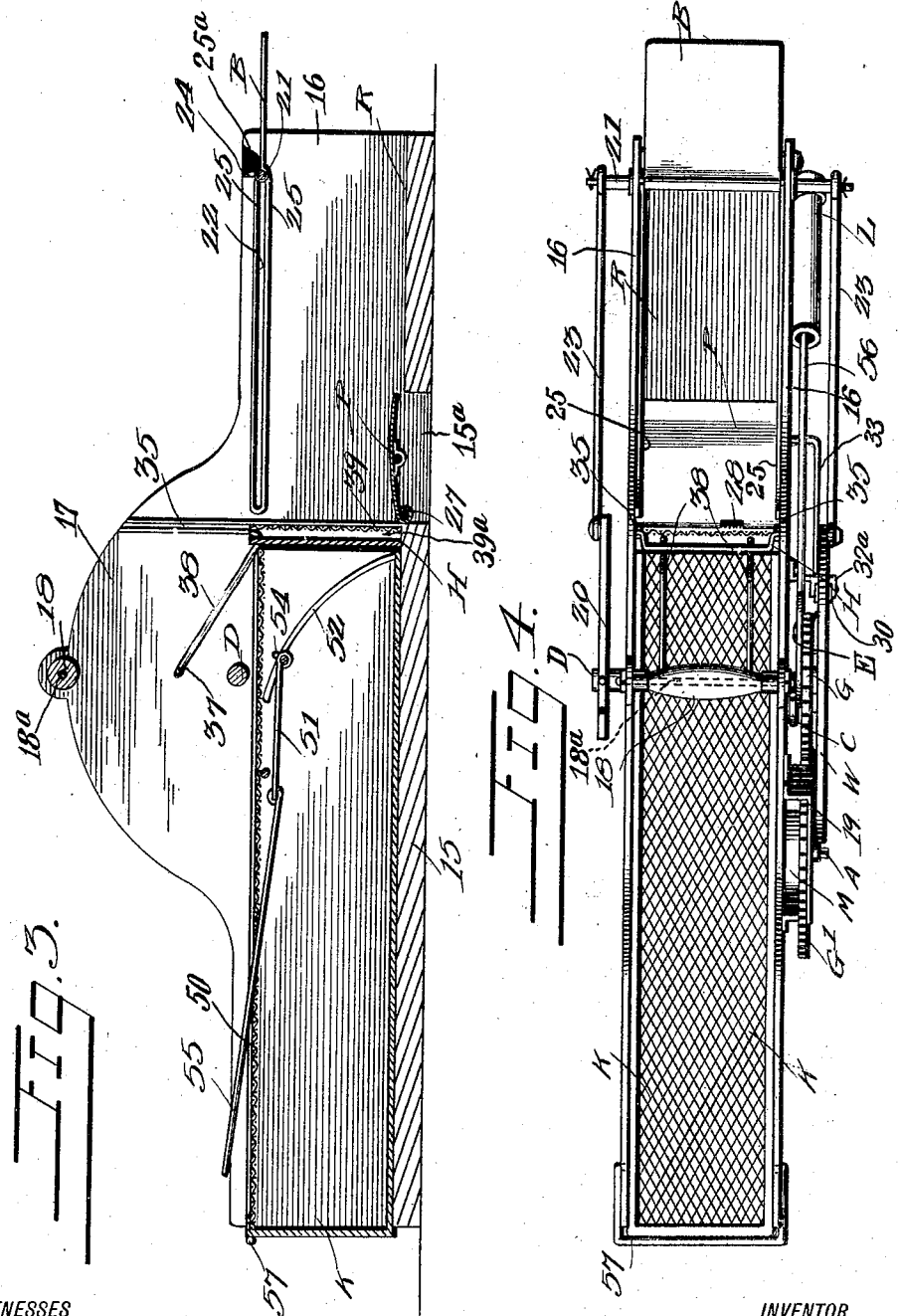

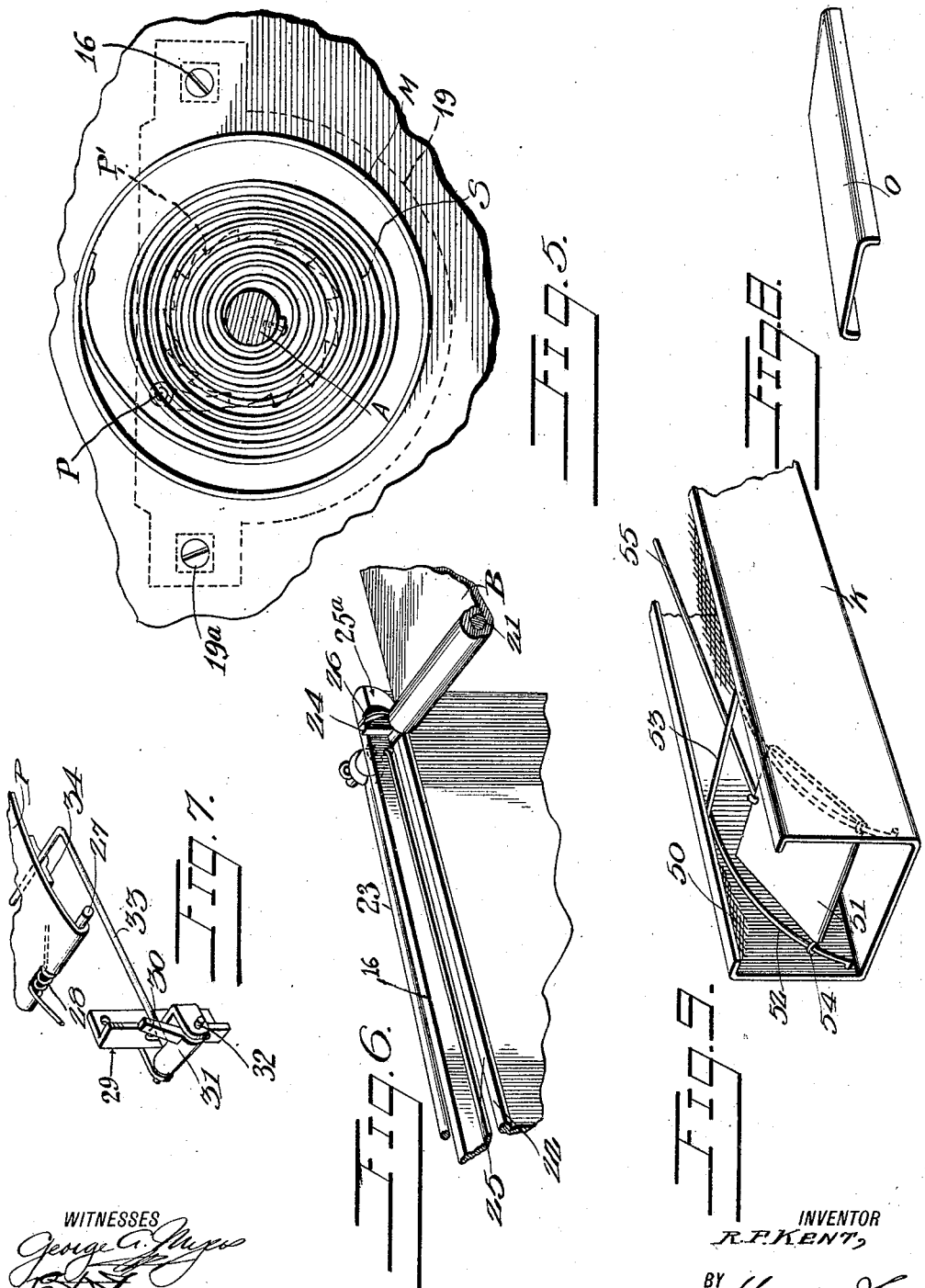

ROBERT FRANKLIN KENT, OF FANNETTSBURG, PENNSYLVANIA.

RAT-TRAP.

1,399,965.  Specification of Letters Patent.  Patented Dec. 13, 1921.

Application filed May 21, 1920. Serial No. 383,071.

*To all whom it may concern:*

Be it known that I, ROBERT FRANKLIN KENT, a citizen of the United States, and a resident of Fannettsburg, in the county of Franklin and State of Pennsylvania, have invented certain new and useful Improvements in Rat-Traps, of which the following is a specification.

My invention relates generally to animal traps, and particularly, although not necessarily, to rat traps.

A purpose of my invention is the provision of a rat trap having a runway in which is removably fitted a cage, and means controllable by a platform located in the runway for forcing the rat into the cage when the rat occupies the platform and for automatically closing the cage so as to confine the animal therein.

It is also a purpose of my invention to provide a trap having motor actuated means for forcing the animal into the cage and for subsequently closing the cage, such means being operable to re-set itself after each actuation.

I will describe one form of trap embodying my invention and will then point out the novel features thereof in claims.

In the accompanying drawings:

Figure 1 is a view showing in side elevation one form of trap embodying my invention.

Fig. 2 is a view similar to Fig. 1 with parts thereof removed and other parts in section.

Fig. 3 is a vertical longitudinal sectional view of the trap shown in the preceding views.

Fig. 4 is a top plan view of the trap shown in the preceding views.

Fig. 5 is an enlarged fragmentary detail view of the spring motor employed in the trap shown in the preceding views.

Fig. 6 is a fragmentary detail view showing the run-way and follower mounting comprised in the trap.

Fig. 7 is a detailed perspective view of the platform and actuating mechanism therefor.

Fig. 8 is a detailed perspective view of the cover plate.

Fig. 9 is a fragmentary perspective view of the cage showing the mechanism with the door in partly closed position.

Similar reference characters refer to similar parts in each of the several views.

Referring specifically to the drawings and particularly to Figs. 1 to 4 inclusive, F designates generally a frame comprising a bottom plate 15 and side plates 16 secured to and upstanding from the longitudinal edges of the bottom plate in a manner to provide a runaway designated at R in Figs. 3 and 4. The side plates 16 are formed medially thereof with enlarged portions 17 connected by a handle 18 which is adapted to be used in moving the trap from place to place. Extending through the enlarged portions 17 and suitably journaled therein is a driven shaft D, one projecting end of which is provided with a wheel W, a driven gear G, an eccentric E and a cam C. The driven gear G meshes with a relatively large driving gear G′ that is adapted to be driven by a conventional form of spring motor S. As illustrated to advantage in Fig. 5, the spring of the motor S is connected to a drum M fixed to the gear G′. The spring is adapted to be wound by means of an arbor A supported in one of the side plates 16 and in a bracket 19 secured to the frame by screws 19a. The unwinding of the spring is prevented by the pawl P and ratchet P′ shown in dotted lines in Fig. 5.

The opposite end of the driven shaft D is provided with an arm 20 of a sufficient weight to counterbalance the weight of the members on the opposite end of the shaft. The wheel W and the arm 20 are connected to and are adapted to actuate a follower designated at B. As shown in Fig. 4, the follower B consists of a rectangular plate of a size to freely move through the runway R. This plate is rigidly connected to a shaft 21 that is mounted for sliding movement within slots 22 formed in the side plates 16. Connected to the opposite ends of the shaft 21 are connecting rods 23 which latter in turn are pivotally connected to the arm 20 and the wheel W. As shown in Fig. 4, one rod 23 is connected to one end of the arm 20, while the other rod is eccentrically connected to the wheel W as clearly shown in Fig. 1. By this arrangement it will be seen that when the shaft D is rotated, the wheel W and the arm 20 effect a movement of the shaft 21 first in one direction and then the other within the slots 22. As the follower B is connected to the shaft 21, it will be clear that under the rotation of the shaft D, the follower will be moved from an outer extreme position into the runway R to an inner extreme position defined by the inner ends of the slots 22, wherefore it is returned to the outer extreme position. When the follower B is in the outer extreme position as shown in Figs. 4 and 6, it occupies a horizontal position so that the adjacent end of the runway is open to allow of the passage of an animal into the runway. However, as the follower B is moved inwardly within the runway R to its inner extreme position, it automatically assumes a vertical position so as to completely span the runway. This movement of the follower from vertical to horizontal position, or vice versa, is obtained by means of lugs 24 secured to the shaft 21, such lugs being forced to occupy a horizontal position when moving through the slots 22 by means of flanges 25 formed on the walls of said slots. As clearly shown in Fig. 6, the lugs 24 are disposed at right angles to the follower B so that when they occupy a horizontal position, the follower is caused to occupy a vertical position, and as the flanges 25 force the lugs to occupy horizontal positions during their movement through the slots, it will be clear that the follower is maintained in a vertical position during this movement. However, when the lugs 24 reach the outer ends of the slots 22 they are caused to assume vertical positions as shown in Fig. 6. This is effected by terminating the upper flange 25 at a point in the rear of the adjacent end of the lower flange 25, and curving the latter upwardly as indicated at 25$^a$. By this arrangement it will be seen that when the lugs 24 move beyond the end of the upper flange 25 they are free to occupy a vertical position and upon further movement of the lugs they engage the upwardly curved end 25$^a$ thus forcing the lugs into vertical position. With the lugs in vertical position, it will be clear that the follower B is temporarily maintained in its horizontal position by means of leaf-springs 26 which are secured to the lower flanges 25 and are arranged in the manner shown in Fig. 6 so as to engage the lugs 24 and to thereby frictionally retain the same in vertical position. It will be understood that the action of the springs 26 does not interfere with the movement of the lugs 24 through the slots 22 so that the normal operation of the follower is unrestricted.

As shown in Figs. 2 and 4, that part of the runway R which is traversed by the follower B is adapted to be covered by a cover plate O, and as shown in Fig. 8 such cover plate is provided at its longitudinal edges with depending flanges which are adapted to engage the outer sides of the plates 16 in securing the same against displacement upon the frame. Suitable locking means such as screws $o$ may be provided to secure the cover plate in position on the frame and against accidental displacement by an animal within the runway.

Referring now to Figs. 3 and 4, it will be seen that the bottom plate 15 of the frame F is formed with an opening 15$^a$ adjacent one end thereof which is spanned by a platform P pivotally mounted upon a stub-axle 27 and biased to a horizontal position by means of a coiled spring 28, as clearly shown in Fig. 7. The platform P is adapted to control the movement of the shaft D by the spring motor S and to this end the wheel W is provided at its periphery with a ratchet tooth 29 that is adapted to be engaged by a pawl 30. As shown in Fig. 7, the pawl 30 is formed integral with a sleeve 31 rotatably mounted upon a stub-axle 32 the latter being supported by a bracket 32$^a$. The sleeve 31 is rigidly connected to an L-shaped arm 33 that extends through a suitable slot 33$^a$ formed in one of the side plates 16 where it is pivotally connected to the platform P by a bracket 34.

In the normal position of the platform P, the pawl 30 engages the ratchet tooth 29 so as to lock the wheel W and consequently the shaft D against rotation. However, when the platform P is depressed against the tension of the spring 28, the arm 33 and the sleeve 31 function to move the pawl 30 out of engagement with the ratchet tooth 29 thereby permitting the spring motor to actuate the shaft D and the members carried thereby. As soon as the platform P is allowed to return to its normal horizontal position, the pawl 30 again contacts with the periphery of the wheel W so that when the wheel has completed one cycle, the ratchet tooth 29 again engages the pawl thereby again locking the mechanism against movement.

During the rotation of the shaft D, the cam C functions to actuate a door H which is designed to control the open end of a cage K. As shown in Figs. 3 and 4, the cage K is adapted to be placed within the runway R with its open end disposed adjacent to the platform P. Between the open end of the cage K and the platform P, the door H is arranged, such door being mounted for vertical movement within guide-ways 35 formed in the confronting faces of the plates 16 as clearly shown in Figs. 3 and 4. The door H is adapted to be moved to open and closed positions by means of the cam C engaging a lateral extension 36 formed on one end of a shaft 37 journaled in the plates 16. The shaft 37 carries a pair of arms 38 which are connected to the door H in the manner shown in Fig. 3 so that when the shaft is rotated in one direction the door is elevated so as to permit free access to the cage K, and when the shaft is released, the door gravitates to closed position so as to obstruct the open end of the cage K. As shown in Figs. 3 and 4, the door H carries a foraminous member 39 which is arranged in spaced relation to the same to provide a compartment 39ª in which bait is adapted to be deposited for enticing the animal into the runway R.

As illustrated to advantage in Figs. 3, 4 and 9, the cage K comprises a substantially U-shaped metallic body closed at its outer end and provided at its top with a screening 50 which allows one to see the contents of the cage and also permits the cage, when submerged to be filled with water to effect drowning of an animal within the cage. As shown in Fig. 9, the open end of the cage is adapted to be closed when removed from the frame F by a door 51 mounted for sliding movement upon a pair of rods 52 secured to the confronting sides of the cage and curved upwardly in the manner shown. The upper ends of the rods are rigidly connected by a cross rod 53 which serves to limit the upward movement of the door upon the rods 52. The door 51 is slidably mounted upon the rods 52 by means of eyes 54 secured to the opposite edges of the door and slidably embracing the rods. The upper end of the door is provided with an operating rod 55 which projects through the screening 50 so that one can grasp the operating rod and thus move the door to open or closed position. In open position the door assumes a horizontal position against the under side of the screening 50.

In the operation of the trap, the cage K is placed within the runway R in the manner shown in Figs. 3 and 4 wherein it will be seen that its open end is disposed contiguous to the door H. The cage K is locked against outward movement with respect to the frame F by means of a pivotally supported bracket 57. It will be understood that with the cage within the runway, the cage door 51 is in open position as shown so that the entrance of an animal into the cage is controlled by the door H. In the normal position of the trap as shown in Figs. 1 and 3, the door H is in closed position and the follower B occupies its outer extreme position so that the animal is free to pass into the runway R and onto the platform P. As soon as the animal steps upon the platform P, his weight causes the platform to rock against the tension of the spring 28 thus moving the pawl 30 out of engagement with the ratchet tooth 29. As soon as the pawl disengages the ratchet 29, the wheel W is released so that the spring motor now functions to rotate the shaft D through the gears G and G' and in the direction of the arrow in Fig. 1. With the rotation of the shaft D, the follower B is moved to its inner extreme position as shown in Fig. 2, and simultaneously with this movement, the door H is elevated to open position under the action of the rotating cam C engaging the extension 36, as has been described. As the animal is in advance of the follower B it will be clear that he is forced in the direction of the cage K so that as soon as the door H moves to open position, the animal is forced to enter the cage. During the continued rotation of the shaft D, the cam C disengages the extension 36 thus allowing the door H to gravitate to closed position. Simultaneous with this operation, the wheel W and the arm 20 function to return the follower B to its normal outer extreme position. Thus, with the door H in closed position and the follower B returned to its normal outer extreme position, the trap is again ready for the catching of a second animal. During this operation of the trap, the wheel W has completed one revolution so that the ratchet tooth 29 is again engaged by the pawl 30. It will thus be seen that when the platform is again depressed so as to trip the pawl 30, the operation of the door and follower is repeated so that as long as the spring motor S is wound sufficient to actuate the shaft D, the trap will continue to catch and then re-set itself without any manual aid. When it is desired to exterminate the animals trapped within the cage K, the door 57 is first moved to closed position whereupon the cage can be removed from the runway R without the danger of the animals escaping from the cage.

To prevent injury to the movable parts of the trap when they are returning to normal position, the eccentric E is employed in conjunction with a dash-pot L to retard the movement of the shaft D. The dash-pot L is conventional in form and the plunger thereof is operatively connected to the eccentric E by means of a rod 56 which is bent to embrace an annular groove formed on the periphery of the eccentric. By means of this connection, the eccentric E serves to operate the piston of the dash-pot L and in such manner that as the follower B moves into its outer extreme position, the rotation of the shaft D is slightly retarded so that distortion or breaking of the members actuating the follower as well as the follower itself is prevented.

Although I have herein shown and described only one form of trap embodying my invention, it is to be understood that various changes and modifications may be made herein without departing from the spirit of the invention and the spirit and scope of the appended claims.

What I claim is:

1. An animal trap comprising, a frame having a runway provided therein, a cage within the runway having one end thereof normally open, a movable platform within the runway, a door mounted within the frame and controlling the open end of said cage, a follower movable through the runway and in the direction of said door, and mechanism controllable by said platform for moving the follower in the direction of the door, elevating the door to open position, and returning the follower to its normal position, and then moving said door to closed position as said follower reaches its normal position.

2. An animal trap comprising, a frame having a runway formed therein, a cage communicating with the runway, a platform within the runway, a door movable in the frame and controlling the entrance to said cage, a follower movable in the runway and capable of occupying one extreme position wherein it spans the runway and is disposed adjacent said door, and another extreme position in which it occupies a non-spanning position with relation to said runway and is disposed at the outer end of the latter, and mechanism controlled by said platform for actuating said door and follower in a predetermined sequence.

3. A trap comprising, a frame having a runway formed therein, a cage within the runway and communicating with the same, a door controlling the entrance to said cage, a follower movable through the runway, motor operated means for actuating said door and follower in a predetermined sequence, and animal operated means for controlling said motor operated means.

4. A trap comprising, a frame having a runway formed therein, a cage within the runway and communicating with the same, a door controlling the entrance to the cage, a bait compartment formed in said door, cam actuated means for elevating said door to open position, a follower movable in said runway, a shaft supporting said follower, slots formed in said frame for slidably receiving said shaft, lugs carried by said shaft, flanges formed on the walls of said slots and engageable with said lugs to cause the latter to occupy predetermined positions during movement of the shaft through the slots, a platform within the runway, eccentrics for moving said shaft laterally within said slots, a motor for actuating said eccentrics and said cam actuated means, and means operable by said platform to control said motor.

5. A trap comprising, a frame having a runway formed therein, a cage within the runway and communicating therewith, a door controlling the entrance to the cage, a follower movable in the runway for forcing animals into the cage, a platform within the runway, and motor actuated means controllable by said platform for actuating said door and follower in a predetermined sequence and for returning the same to normal position.

6. A trap comprising, a frame having a runway formed therein, a cage within the runway and communicating with the same, a door controlling the entrance to the cage, a platform within the runway, a follower movable within the runway and capable of occupying non-spanning position with respect to the runway when at the other end of the latter and a spanning position when moving over the runway, and means controllable by said platform for actuating said door and follower in a predetermined sequence.

7. A trap comprising, a frame having a runway formed therein, a cage within the runway and communicating with the same, a door controlling the entrance to the cage, a bait compartment formed in said door, a platform within said runway and adjacent said door, a follower movable through the runway in the direction of the entrance into said cage, and motor operated means controllable by said platform for moving said door to open position, moving said follower toward the entrance end of said cage, and returning said door to closed position when said follower reaches a position adjacent said cage.

8. A trap comprising, a frame having a runway formed therein, a cage within the runway and normally communicating therewith, a door controlling the entrance end of said cage, a bait compartment formed in said door, a movable platform adjacent said door, a follower movable through said runway in the direction of the entrance end of said cage, motor operated means controllable by said platform for actuating said door and follower in a predetermined sequence and for returning the same to normal positions, and a second door carried by said cage and manually operable to close the entrance end thereof.

9. A trap comprising, a frame having a runway formed therein, a cage removably fitted within the runway and communicating therewith, a door controlling the entrance end of said cage, a platform within the runway adjacent said door, a follower movable through the runway in the direction of the entrance end of said cage, motor operated means for actuating said door and follower in a predetermined sequence and for returning the same to their normal positions, said means being controllable by said platform, and means for retarding the movement of said means as the follower is returned to its normal position, for the purpose described.

10. A trap comprising, a frame having a runway formed therein, a cage removably fitted within the runway and communicating therewith, a door controlling the entrance end of said cage, a platform within the runway adjacent said door, a follower movable through the runway in the direction of the entrance end of said cage, motor operated means for actuating said door and follower in a predetermined sequence and for returning the same to their normal positions, said means being controllable by said platform, and means for retarding the movement of said means as the follower is returned to its normal position, said last mentioned means comprising a dash-pot and an eccentric connected to the piston of said dash-pot.

ROBERT FRANKLIN KENT.